Dec. 6, 1960

S. L. McDONOUGH 2,963,224

CONSTANT RESPONSE TIME FOLLOW-UP SYSTEM

Filed April 27, 1956

INVENTOR.
SIDNEY LEE McDONOUGH

BY George Sipkin
Lee I. Huntzberger
ATTORNEYS

United States Patent Office 2,963,224
Patented Dec. 6, 1960

2,963,224

CONSTANT RESPONSE TIME FOLLOW-UP SYSTEM

Sidney Lee McDonough, Snyder, N.Y., assignor, by mesne assignments, to the United States of America as represented by the Secretary of the Navy Filed Apr. 27, 1956, Ser. No. 581,262

10 Claims. (Cl. 235—196)

This invention relates to a follow-up system and, more particularly, to a computing device which produces an output signal therefrom that is a given function of the ratio of two input signals, which may be independent variables, applied thereto.

In an analogue computer, it is often desirable to produce an output which is some given function of the ratio of two independently varying signals. Since the ratio of two signals is dependent only on the relative magnitudes thereof, and not on the absolute magnitudes of the signals, to obtain a wide dynamic range the response time of such an analogue computer should be substantially independent of the absolute magnitudes of the input signals. This invention contemplates a follow-up system, which may be used as an analogue computing device for obtaining an output which is a given function of the ratio of two independent variable inputs, wherein the response time of the follow-up system is substantially independent of the absolute magnitudes of the input signals.

It is therefore an object of this invention to provide a follow-up system, responsive to the respective magnitudes of first and second variable signals applied as inputs thereto, which has a response time which is substantially independent of the absolute magnitudes of the first and second variable signals;

It is a further object of this invention to provide a follow-up system, responsive to the respective magnitudes of first and second variable signals applied as inputs thereto, for obtaining a desired output having a value which is a given function of the ratio of the first and second variable signals, and wherein any error which may exist between the desired and actual outputs of the follow-up system is minimized at a rate which is substantially independent of the absolute magnitudes of the first and second variable signals;

It is a still further object of this invention to provide a follow-up system employing a servo-mechanism incorporating derivative damping, wherein the magnitude of derivative damping provided is directly proportional to the absolute magnitude of the input applied thereto.

Other objects and many of the attendant advantages of this invention will be readily appreciated as the same becomes better understood by reference to the following detailed description when considered in connection with the accompanying drawing wherein.

Figure 1:
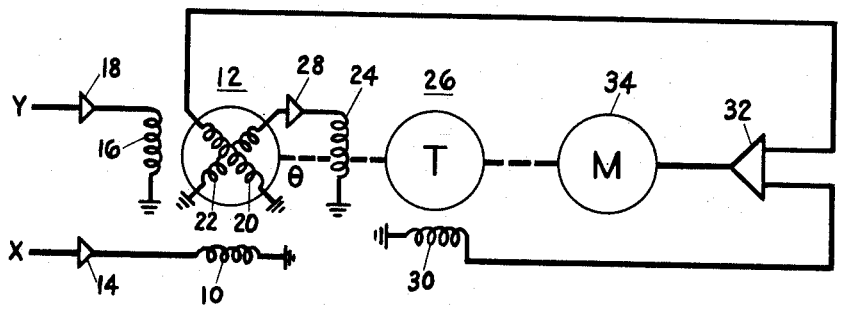
Fig. 1 is a first embodiment illustrating the principles of this invention.

Referring now to Fig. 1, a first independent variable signal X is applied to first stator winding 10 of resolver 12, after suitable amplification by amplifier 14. A second independent variable signal Y is applied to stator winding 16 of resolver 12, after suitable amplification by amplifier 18. Stator windings 10 and 16 of resolver 12 are oriented perpendicular to each other, as shown. The signals are alternating voltages having the same frequency and phase, and also respective amplitudes which are independently variable over respective ranges.

The application of input signals to stator windings 10 and 16 results in output signals being induced in rotor windings 20 and 22, respectively, of resolver 12. Rotor windings 20 and 22 are also oriented perpendicular to each other, as shown.

The output signal derived across rotor winding 22 of resolver 12 is applied to field winding 24 of tachometer 26, after suitable amplification by amplifier 28. The difference between the output signal derived across rotor winding 20 of resolver 12 and output winding 30 of tachometer 26 is applied as an input to servoamplifier 32.

The output of servoamplifier 32, which is proportional to the input applied thereto, energizes servomotor 34. The output shaft of servomotor 34 is mechanically linked to the rotors of resolver 12 and tachometer 26, to thereby rotate them with an acceleration which is proportional to the energization of servomotor 34.

Considering now the operation of the embodiment shown in Fig. 1, the respective output signals induced in rotor windings 20 and 22 have respective magnitudes which are dependent not only on the absolute magnitudes of signals X and Y, respectively, but also on the angular orientation of the rotor windings with respect to the stator windings. There is a certain angular orientation of rotor winding 20 at which no output signal is induced therein. This certain angular orientation is dependent on the relative magnitudes, i.e., the ratio of absolute magnitudes of input signals X and Y applied to stator windings 10 and 16, respectively.

Should the angular orientation of rotor winding 20 be other than this certain value, an input will be applied therefrom to servoamplifier 32, and servomotor 34 will therefore be energized. Since the rotor of resolver 12 is mechanically linked to the shaft of servomotor 34, the angular orientation of rotor winding 20 will be varied by the operation of servomotor 34 until this certain value is reached, whereupon the output therefrom becomes zero, and no more input is applied to servoamplifier 32. Therefore, servomotor 34 stops. This certain value of angular orientation of rotor winding 20 is proportional to the arc tangent of the ratio of the X and Y signals.

During the period when servomotor 34 is energized, and the shaft thereof is therefore rotating, an output will be derived across output winding 30 of tachometer 26. This output will be proportional to the product of the speed of rotation of the shaft of servomotor 34 and the intensity of energization of field winding 24 of tachometer 26. Field winding 24 of tachometer 26 is supplied with an energization which is proportional to the output signal derived across rotor winding 22 of resolver 12. Since rotor winding 22 is oriented perpendicular to rotor winding 20, the output signal derived across rotor winding 22 is substantially proportional to the square root of the sum of the squares of the X and Y input signals for relatively small errors in the angular orientation of rotor winding 20.

Since the input applied to servoamplifier 32 is equal to the difference between the outputs from rotor winding 20 of resolver 12 and output winding 30 of tachometer 26, it will be seen that any increase in the output from output winding 30 will reduce the input to servoamplifier 32. Since the output from winding 30 is proportional to the product of the rate of rotation of servomotor 34 and the energization of field winding 24, an increase in the rate of rotation of servomotor 34 and/or an increase in the absolute magnitudes of the input signals X and Y will result in an increase in the output derived across output winding 30 of tachometer 26. Furthermore, since the output signal derived across rotor winding 20 of resolver 12 is substantially proportional to the absolute magnitudes of input signals X and Y, as well as the error in the angular orientation of the rotor, the output from rotor winding 20 will also increase with an increase in the absolute magnitudes of input signals X and Y. Therefore, the input to servoamplifier 32, which is equal to the difference between the outputs from rotor winding 20 of resolver 12 and output winding 30 of tachometer 26, will be substantially independent of the absolute magnitudes of input signals X and Y. This is true because any increase from the output of rotor winding 20 due to the increase in the absolute magnitudes of input signals X and Y is counteracted by a similar increase in the output from output winding 30 of tachometer 26.

Figure 2:
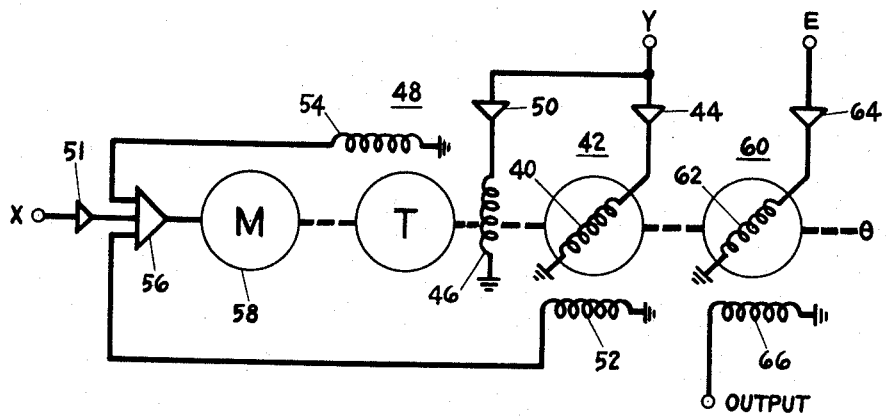
Fig. 2 is a second embodiment illustrating the principles of this invention.

Referring now to Fig. 2, which discloses a circuit which is basically similar to the circuit disclosed in Fig. 1, input signal Y is connected to rotor winding 40 of resolver 42, after suitable amplification by amplifier 44. Input signal Y is also applied to field winding 46 of tachometer 48 after suitable amplification by amplifier 50.

The difference between input signal X, which may be amplified by amplifier 51, and the sum of the output signal derived across stator winding 52 of resolver 42 and output winding 54 of tachometer 48 is applied as an input to servoamplifier 56, which operates servomotor 58. The shaft of servomotor 58 is mechanically linked to the rotors of tachometer 48 and resolver 42. The shaft of servomotor 58 is also linked to the rotor of resolver 60. Resolver 60 has a fixed reference voltage E applied to its rotor winding 62, after suitable amplification by amplifier 64. The output of the circuit shown in Fig. 2 is derived across stator winding 66 of resolver 60. Rotor winding 62 of resolver 60 is angularly aligned with rotor winding 40 of resolver 42.

Considering now the operation of the circuit shown in Fig. 2, the output signal derived across stator winding 52 of resolver 42 is proportional to $Y \sin \theta$, where $\theta$ is the angular orientation of the rotor windings. The servomechanism formed by servoamplifier 56 and servomotor 58 operate to vary the angular position of the rotor of resolver 42 until the output across the stator 52 is equal to input signal X, i.e., $X = \sin \theta$. Therefore, $\sin \theta = X/Y$. Since rotor 60 of resolver 62 is angularly aligned with rotor 40 of resolver 42, the output obtained from stator winding 66 of resolver 62 is proportional to $E \sin \theta$, but $\sin \theta$ is equal to $X/Y$. Therefore, the output voltage derived across stator winding 66 of resolver 60 is proportional to the product of $E (X/Y)$.

In the embodiment shown in Fig. 2, the response time of the circuit is made independent of the absolute magnitudes of the X and Y input signals in a manner substantially identical to that discussed in connection with Fig. 1, viz., applying a signal proportional to the absolute magnitudes of the independent variable input signals as the input to the field winding of the tachometer. The only difference between the two cases, is that in Fig. 1 a signal proportional to the square root to the sum of the squares to the input signals X and Y is applied to the field winding of the tachometer, while in Fig. 2 a signal proportional to only the absolute magnitude of the input signal Y is applied to the field winding of the tachometer. The system in Fig. 2, however, would operate satisfactorily if a signal proportional to X, rather than Y, were applied to the field winding of the tachometer, or, for that matter, any other combination of the X and Y signals, so long as it had a magnitude dependent on the absolute magnitudes of the input signals. This is true, because the disclosed follow-up systems are sensitive to the relative magnitudes of the two input signals. Therefore, if the absolute magnitude of at least one of the input signals is known, and the relative magnitudes of the input signals is effectively known, the absolute magnitude of the other of the input signals is also effectively known.

Obviously many modifications and variations of the present invention are possible in the light of the above teachings. It is therefore to be understood that within the scope of the appended claims the invention may be practiced otherwise than as specifically described.

I claim:

1. A follow-up system for obtaining an output which is a given function of the ratio of two independent and variable input signals, which comprises a resolver having two rotor windings oriented at 90° apart and two stator windings oriented at 90° apart, a separate input connection for each of said two input signals, one of said connections being connected through one of said stator windings to ground and the other of said connections being connected through the other stator winding to ground, a tachometer having a field winding and an output winding, a servomotor operatively connected to the rotors of said tachometer and said resolver to operate them, one of said resolver rotor windings being connected at one end to ground and at its other end through said tachometer field winding to ground, a servoamplifier connected to said servomotor to supply operating current thereto, the other of said resolver rotor windings being connected at one end to ground and at its other end to the input side of said servoamplifier, the output winding of said tachometer being connected at one end to ground and at its other end to the input side of said servoamplifier, whereby the angular position in which said servomotor stops said resolver is a function of the ratio between said two input signals and hence the output.

2. The system as set forth in claim 1, and an amplifier in each of the signal input circuits before the resolver stator windings, and an amplifier in the connection between said one of said resolver rotor windings and the field winding of said tachometer.

3. A follow-up system for obtaining an output which is a given function of the ratio of two independent and variable input signals, which comprises a servomotor, a servoamplifier connected to said motor to supply operating current thereto, a tachometer having a field winding and an output winding, two resolvers each having a rotor winding and a stator winding, said motor being operatively coupled to the rotors of said tachometer and said two resolvers to operate them, said resolver rotor windings being angularly aligned, means for passing a fixed reference voltage through the rotor of one of said resolvers whose stator winding comprises an output circuit, means for passing part of one of said signals through the rotor winding of the other of said resolvers, means for passing signals generated in the stator of the said other of said resolvers to the input side of said servoamplifier, means for passing another part of said one of said signals through said field winding of said tachometer, means for passing the output of said output winding of said tachometer to the input side of said servomotor.

4. The system as set forth in claim 3, and means for amplifying said one of the two input signals before it passes through said resolver rotor winding and said tachometer field winding, and means for amplifying the other of said signals before it reaches said servoamplifier.

5. In a follow-up system for obtaining an output which is a given function of the ratio of two independent and variable input signals, the combination which comprises a servomotor, a servoamplifier connected to said motor to supply operating current thereto, a current induction generator having a rotor and field and output windings, with its rotor connected to said motor for rotation thereby, a resolver having a stator winding and a rotor winding, said rotor winding of said resolver being operatively coupled to said servomotor for rotation thereby, means for passing one of said signals through one of said resolver windings to induce in the other of the resolver windings a signal current which will be proportional in magnitude to the angular relation between said resolver windings, means for passing through said field winding of said current generator a signal current also controlled by said one of said signals, means for passing to said servoamplifier the signal generated in said output winding of said current generator and a signal induced in said other of said resolver windings, and the other of said signals.

6. In a follow-up system for obtaining an output which is a given function of two independent and variable input signals, the combination comprising a servomotor, a current induction generator having a rotor and activating and output windings, one of which is on said rotor and the other stationary, with its rotor connected to said motor for operation thereby, a resolver having a stator winding and a rotor winding, the latter being operatively coupled to said motor for rotation thereby, means for passing one of said signals through one of said resolver windings to induce in the other resolver winding a signal current which will be proportional in magnitude to the cosine of the angular relation between said resolver windings, means for passing through said activating winding of said generator a singal current controlled in magnitude by one of said signals, and means for controlling the activity of said motor jointly by both of said signals and the current from said output winding of said generator.

7. The combination as set forth in claim 6, and a second resolver having rotor and stator windings with the rotor winding coupled to said motor for operation thereby, the rotor winding of the second resolver being aligned angularly with the rotor winding of the first mentioned resolver, means by which a fixed reference voltage may be passed through said rotor winding of said second resolver, and the stator winding of said second resolver serving as an output for the system.

8. A follow-up system responsive to the respective magnitudes of first and second variable signals of alternating voltages of the same frequency and phase, independently variable over selected ranges, applied as inputs thereto for obtaining a desired output having a magnitude which is a given function of the quotient of the magnitude of said first signal divided by the magnitude of said second signal, said system comprising a resolver having a rotor with windings angularly aligned with one another and stator windings adjacent said rotor and oriented at right angles to one another, an individual circuit through each stator winding, through one of which one signal passes and through the other of which the other signal passes, a tachometer having a field winding connected to one of said rotor windings to be energized by the current induced therein by both of said signals and also having an output winding, a servomotor connected to said rotor and said tachometer to rotate the same, and circuit means controlled jointly by the current from said tachometer output winding and by the current induced in the other of said rotor windings by said signals for causing operation of said servomotor.

9. A follow-up system responsive to the respective magnitudes of first and second variable signals of alternating voltages of the same frequency and phase with amplitudes which are independently variable over respective ranges applied as inputs thereto for obtaining a desired output having a magnitude which is a given function of the quotient of the magnitude of said first variable signal divided by the magnitude of said second variable signal, said system comprising a servomotor, a current generator and a resolver operated by said servomotor and having stator and rotor windings, two circuits for receiving separate signals, means for causing the creation in said generator of an output current which is proportional in magnitude to one of said first and second variable signals, one of said resolver windings being a part of one signal circuit and the other of which windings supplies an induced current to said means, another means controlled jointly by one of said signal circuits, said resolver and said output current for controlling the operation of said servomotor.

10. A follow-up system responsive to the respective magnitudes of first and second variable signals of alternating voltages of the same frequency and phase with amplitudes which are independently variable over respective ranges applied as inputs thereto for obtaining a desired output having a magnitude which is a given function of the quotient of the magnitude of said first variable signal divided by the magnitude of said second variable signal, said system comprising a servomotor, a current generator and a resolver operated by said servomotor and having a pair of rotor windings oriented perpendicularly to each other and a pair of stator windings also oriented perpendicularly to each other, two circuits for receiving separate signals, means for causing the creation in said generator of an output current which is proportional in magnitude to one of said first and second variable signals, one of said stator windings forming a part of one of said signal circuits and the other stator winding forming a part of the other of said signal circuits and one rotor winding supplying activating current to said generator, and the other rotor winding supplying signal current to said means, another means controlled jointly by one of said signal circuits, said resolver and said output current for controlling the operation of said servomotor.

References Cited in the file of this patent

UNITED STATES PATENTS

| | | |
|---|---|---|
| 2,497,216 | Greenough | Feb. 14, 1950 |
| 2,525,636 | Bedford et al. | Oct. 10, 1950 |
| 2,671,875 | Urbanik | Mar. 9, 1954 |